United States Patent
Poorman et al.

(10) Patent No.: US 8,184,394 B2
(45) Date of Patent: May 22, 2012

(54) TRANSDUCER HEAD ASSEMBLIES AND MODULES

(75) Inventors: Paul W. Poorman, Meridian, ID (US); Donald J. Fasen, Boise, ID (US); Mike Alan Holmberg, Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 12/763,682

(22) Filed: Apr. 20, 2010

(65) Prior Publication Data

US 2011/0255195 A1    Oct. 20, 2011

(51) Int. Cl.
*G11B 5/584* (2006.01)
*G11B 21/02* (2006.01)

(52) U.S. Cl. .................................. 360/77.12; 360/75
(58) Field of Classification Search .................. None
See application file for complete search history.

(56) References Cited

U.S. PATENT DOCUMENTS

| | | | |
|---|---|---|---|
| 6,771,456 B2 * | 8/2004 | Winarski et al. | 360/78.02 |
| 6,798,605 B2 * | 9/2004 | Kurita et al. | 360/75 |
| 7,054,093 B1 * | 5/2006 | Anderson et al. | 360/75 |
| 7,054,101 B1 * | 5/2006 | Marion et al. | 360/90 |
| 7,133,261 B2 * | 11/2006 | Biskeborn | 360/291 |
| 7,193,812 B2 | 3/2007 | Eaton | |
| 7,221,534 B2 | 5/2007 | Anderson | |
| 7,342,738 B1 | 3/2008 | Anderson | |
| 7,474,495 B2 | 1/2009 | Weng | |
| 7,486,464 B2 | 2/2009 | Saliba | |
| 7,538,966 B2 | 5/2009 | Day | |
| 2009/0027803 A1 | 1/2009 | Biskeborn | |

* cited by examiner

*Primary Examiner* — K. Wong

(57) ABSTRACT

In one embodiment a transducer head assembly is disclosed having a head module. The head module comprises at least one media bearer element providing a media bearer surface, and a head element block having an array of head elements. The assembly further comprises a carrier structure to carry the head module, and an actuator to move the head element block relative to the at least one media bearer element. Tape drive apparatus having actuator apparatus to cause relative displacement between head element blocks is also disclosed. A transducer head module and a method of making a transducer head assembly are also disclosed.

16 Claims, 15 Drawing Sheets

TRANSDUCER HEAD ASSEMBLIES AND MODULES

BACKGROUND

Data transfer devices are known that comprise a transducer head to transfer data between the device and tracks on data media, for storing data on the data media, which may be removably received in the device. However, such data media can be susceptible to dimensional instability under varying operating conditions, for example varying temperature and humidity. Such dimensional instability can affect head/track alignment. Track pitches are tending to become smaller due to the industry trend to increase data density on data media. The channel pitch (distance between head element center lines) may be significantly larger than the track pitch, for example a 100 μm channel pitch relative to a 10 μm track pitch. As the channel count and the head span increase, it can become difficult to align all the head elements with the track locations as the data media expands or contracts, so that, for example, the outermost head elements are not positioned within acceptable limits. This can lead to problems in recovering data from the media.

BRIEF DESCRIPTION OF THE DRAWINGS

In order that the invention may be well understood, various embodiments thereof will now be described, by way of example only, with reference to the accompanying drawings, in which.

DETAILED DESCRIPTION

Figure 1:
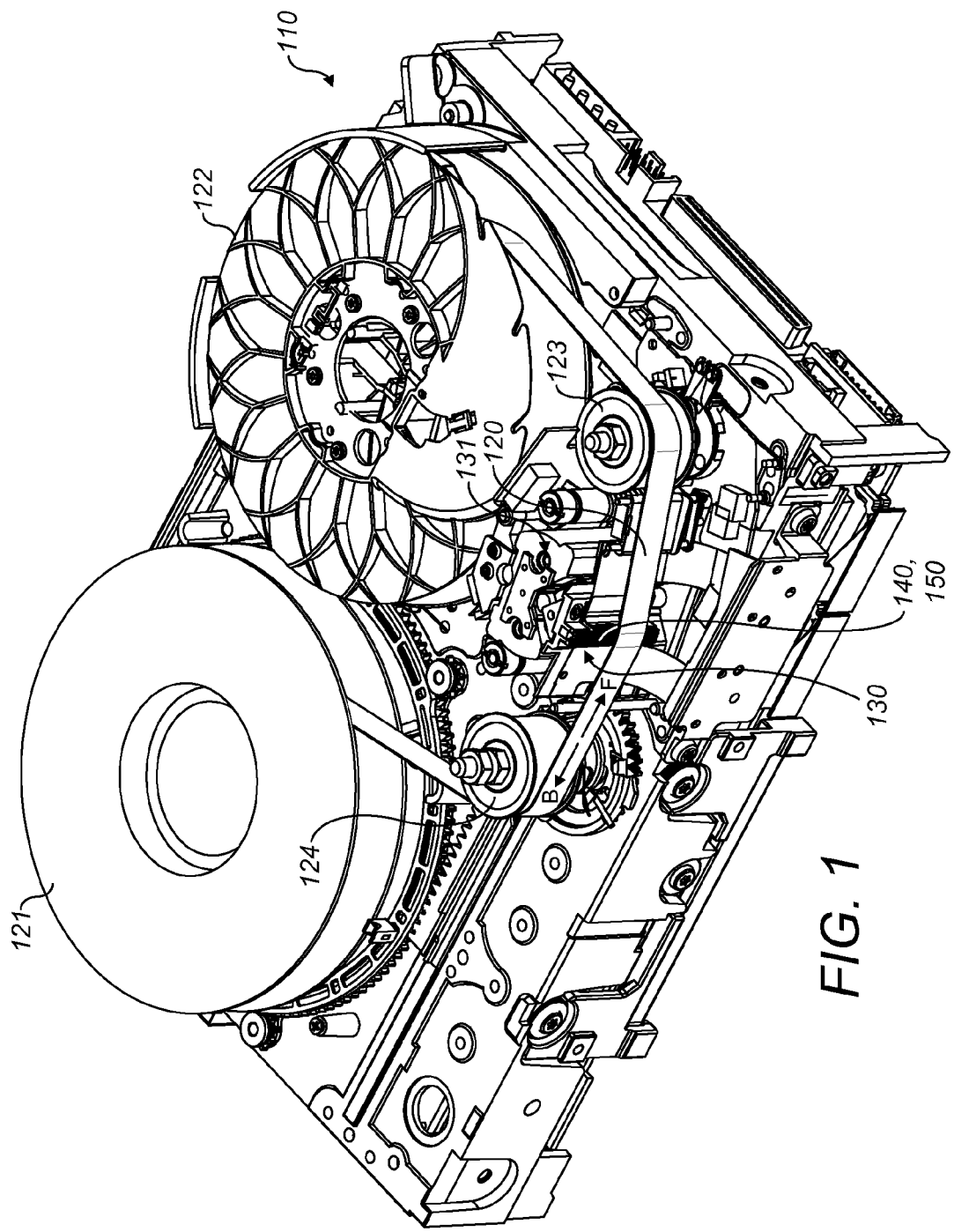
FIG. 1 is a perspective view of selected portions of a data transfer device in the form of a tape drive comprising a transducer head assembly.

Various embodiments of the present invention relate to a transducer head assembly comprising transducer head elements arrayed in a head element block, for example a silicon-based chip comprising transducer head element circuitry. In at least some embodiments, the block forms part of a head module comprising at least one media bearer element that cooperates with the head element block to provide a bump, or rail, that provides a media bearer surface. The exemplary head assembly may be used in a data transfer apparatus, for example a tape drive for transducing data to and from magnetic or other tape media, the media bearer surface being arranged and configured to engage and support the tape media for movement relative to the head elements. The exemplary head assembly may comprise a carrier structure mountable to a linear actuator, the actuator being controllable by a servo system of the tape drive to move the head assembly laterally of the tape media (laterally of the axis of movement of the tape media between tape reels).

In at least some embodiments, the head element block is movable relative to the at least one media bearer element of the head module, and a head element block actuator may be provided between the carrier structure and the head element block for moving the head element block. A further head element block may be provided, comprising further head elements. The further head element block may be provided, for example, in a further rail of a further head element module, the further rail being laterally offset (offset in the major direction of tape movement between tape reels) relative to the first-mentioned rail. Under normal operating conditions, the head assembly actuator is operable to align elements of both head element blocks with respective tracks of a set of parallel data tracks that extend along the tape, to concurrently transduce data relative to the respective data tracks.

Using current magnetic tape materials technology, including for example PEN and/or PET based substrates, it is difficult to eliminate expansion and/or contraction of the tape relative to the head assembly. For example, using tensilized substrates tape dimensional instability may be reduced to the order of about 900 ppm (parts per million). The channel pitch (head element pitch) may be of the order of 100 μm, and assuming an exemplary channel count of, say, 16 or 32 heads, a head span of approximately 1.6 mm or 3.2 mm is required. Track pitch may be of the order of 10 μm, and 10 or more adjacent tracks may be written in parallel between the tracks of a concurrently written set of data tracks. Under some operating conditions lateral expansion or contraction of the tape may alter the lateral separation distance of tracks within a track set and it may not be possible to sufficiently well align the head elements with their respective data tracks, potentially resulting in data being written off track, or inability to recover data. For example, with the lateral centers of head element arrays of the head element blocks aligned relative to the lateral center of a data track set by the head assembly actuator, the laterally outermost data read and/or write head elements of the head element blocks of respective head element modules may be so out of alignment with the laterally outermost data tracks of the track set that read and/or write problems ensue. Such problems are likely to increase in the future due to the demand for reduced track pitch and increased channel count to increase storage capacity and/or data transfer speed.

In at least some embodiments, a servo control circuit can control the head assembly actuator and the head element block actuator to permit alignment of head elements of the block relative to a first subset of tracks of a track set, while the further head elements of the second head element block are concurrently aligned relative to a second subset of tracks of the track set, the first subset being different from the second subset. For example, a lateral center of an upper half of the data read and/or write head elements of the movable head element block can be aligned with a lateral center of a track subset comprising an upper half of the track set, and a lateral center of a lower half of the data read and/or write head elements of the further head element block can be laterally aligned with a lateral center of a further track subset comprising a lower half of the track set. This facilitates a reduction in the maximum potential misalignment of active data read and/or write head elements with their respective data tracks. In alternative embodiments, the further head element block may also be movable relative to at least one fixed media bearer element of the further head element module. In further alternative embodiments, a further head element block may be provided in mutual longitudinal alignment with a movable head element block in the same rail as the movable head element block. In some embodiments, still further head element blocks may be provided, in the same rails or in further rails, at least some of the still further head element blocks being movable.

In some embodiments, the head element block actuator comprises a piezoelectric element. The relatively compact size and ease of connectability of piezoelectric elements facilitates convenient location of the actuator between the head element block and the carrier. For example, one side of the piezoelectric element may be operationally connected, for example bonded, to a rearwardly facing longitudinally extending surface of the head element block, and an opposite side of the piezoelectric element may be operationally connected, for example bonded, to a forward facing surface of the carrier structure. In some embodiments, the piezoelectric element is configured and controlled to provide a shearing action between the head element block and the carrier structure in a longitudinal direction of the head element block. This arrangement facilitates simplicity and/or ease of fabrication and assembly of a transducer head assembly. In at least some embodiments, a transducer head module comprising a head element chip is bonded, for example directly bonded, to a piezoelectric element actuatable in shear mode. In some embodiments, electrically conductive connections are provided to enable operation of the piezoelectric element in shear mode, the piezoelectric element is bonded to the carrier structure, and the head assembly is assembled so as to permit movement of the head element block relative to the carrier in a direction of the shear axis. This approach facilitates making of a transducer head assembly with minimal changes to current methods of making head assemblies.

Figure 2:
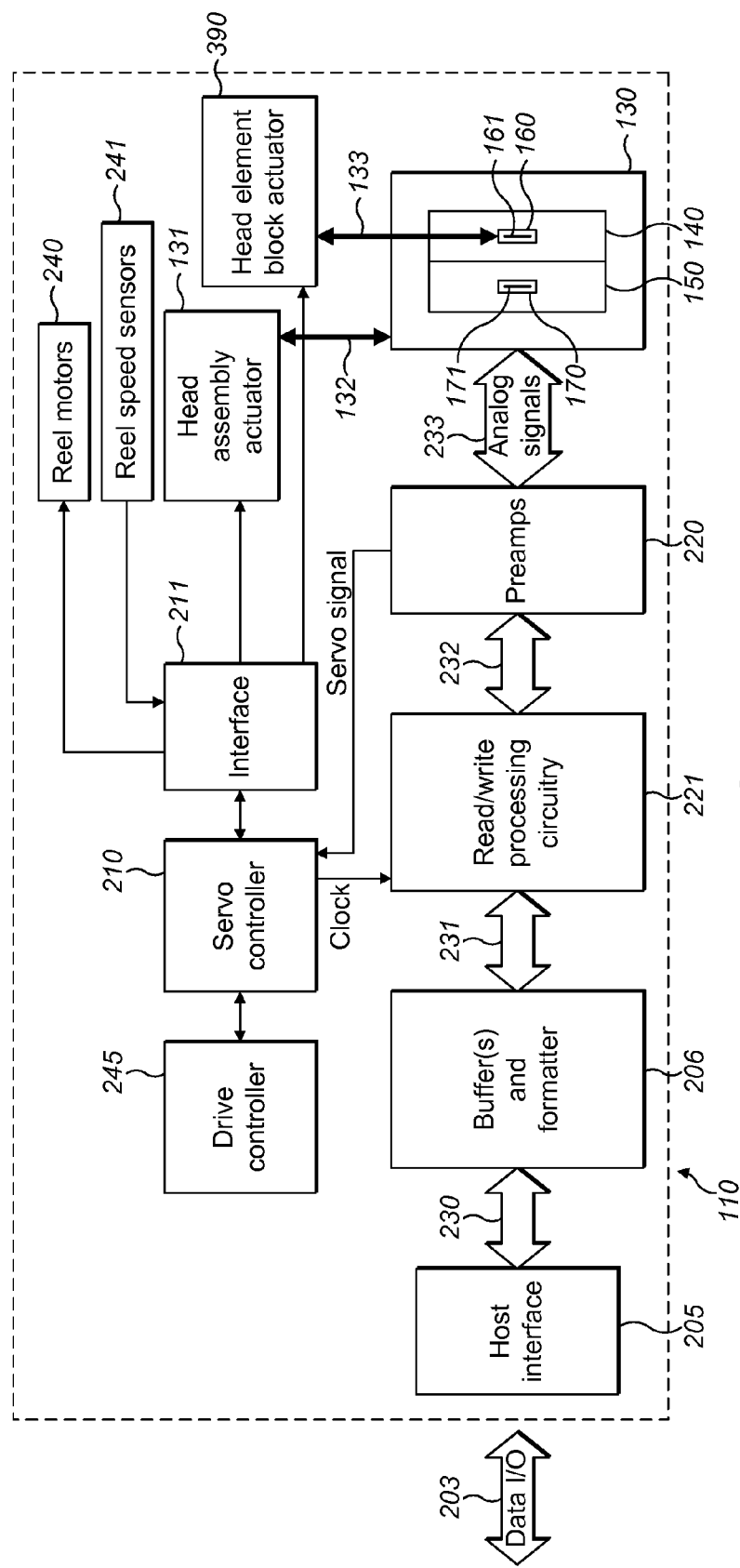
FIG. 2 is a schematic diagram showing functional components of the data transfer device.

FIG. 1 is a perspective view showing selected portions of a data transfer device 110 in the form of a tape drive, and FIG. 2 is a schematic diagram illustrating functional components of the data transfer device 110. The tape drive 110 is operable to removably receive a cartridge (not shown) including a data carrier media 120, for example in the form of a tape such as a magnetically writable and/or readable tape. The tape 120 is selectively driveable in opposite directions forward F and back B along its length by two reels 121, 122 driven by respective motors 129 (FIG. 2) over guides 123, 124 so as to pass in controlled proximity to at least one head module 140, 150 of a transducer head assembly 130. The transducer head assembly 130 is movable relative to the tape 120 (up-and-down in the orientation shown in FIG. 1) by a head assembly actuator 131, as indicated by the arrow 132 in FIG. 2. The head assembly actuator 131 can comprise, for example, a voice coil motor or any other convenient type of actuator and/or mechanism suitable for positioning the head assembly in a direction lateral to a major direction of tape movement B, F.

Figure 3:
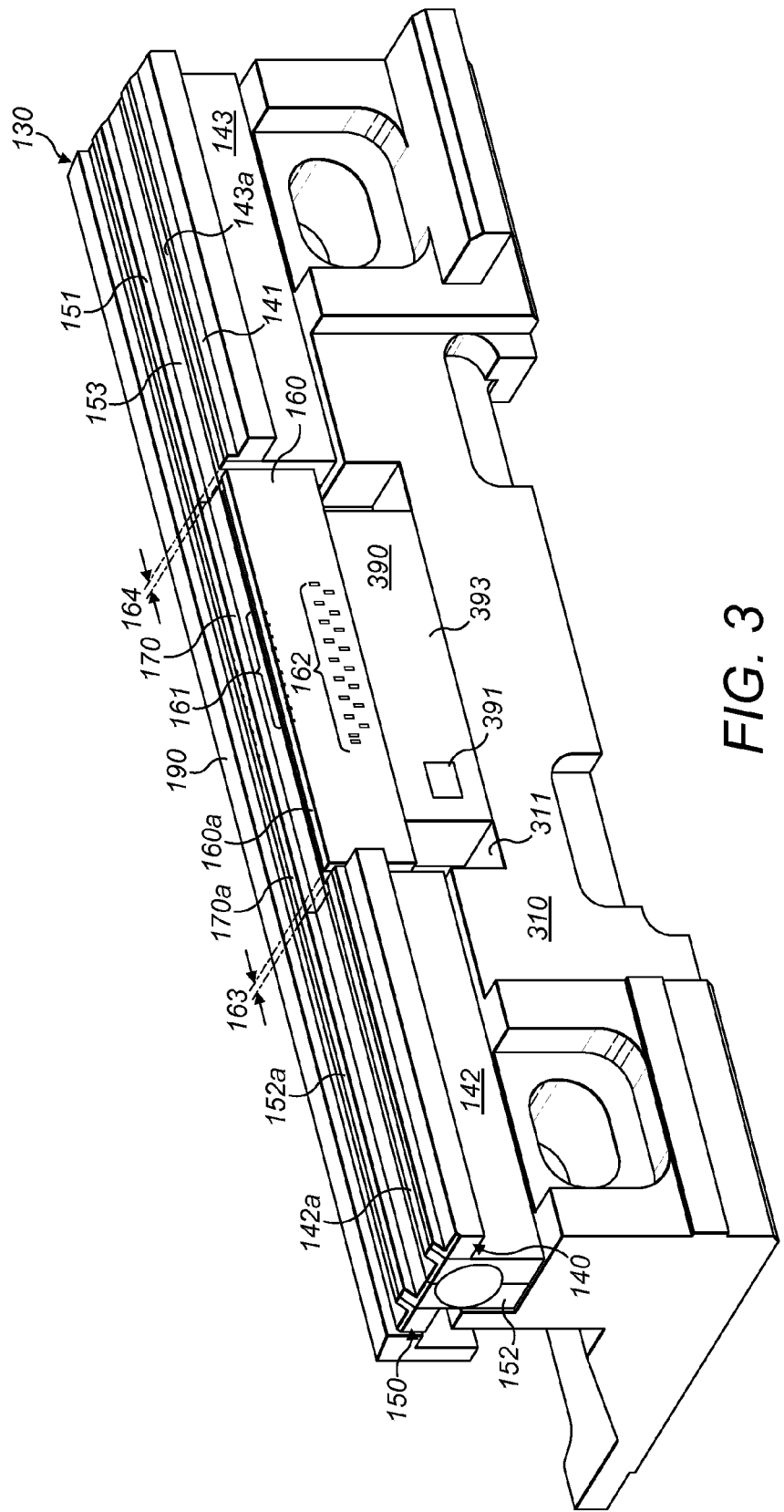
FIG. 3 is a perspective view showing portions of an exemplary transducer head assembly including a movable transducer head element block, with an outrigger and a cover bar of the assembly not shown.
Figure 4:
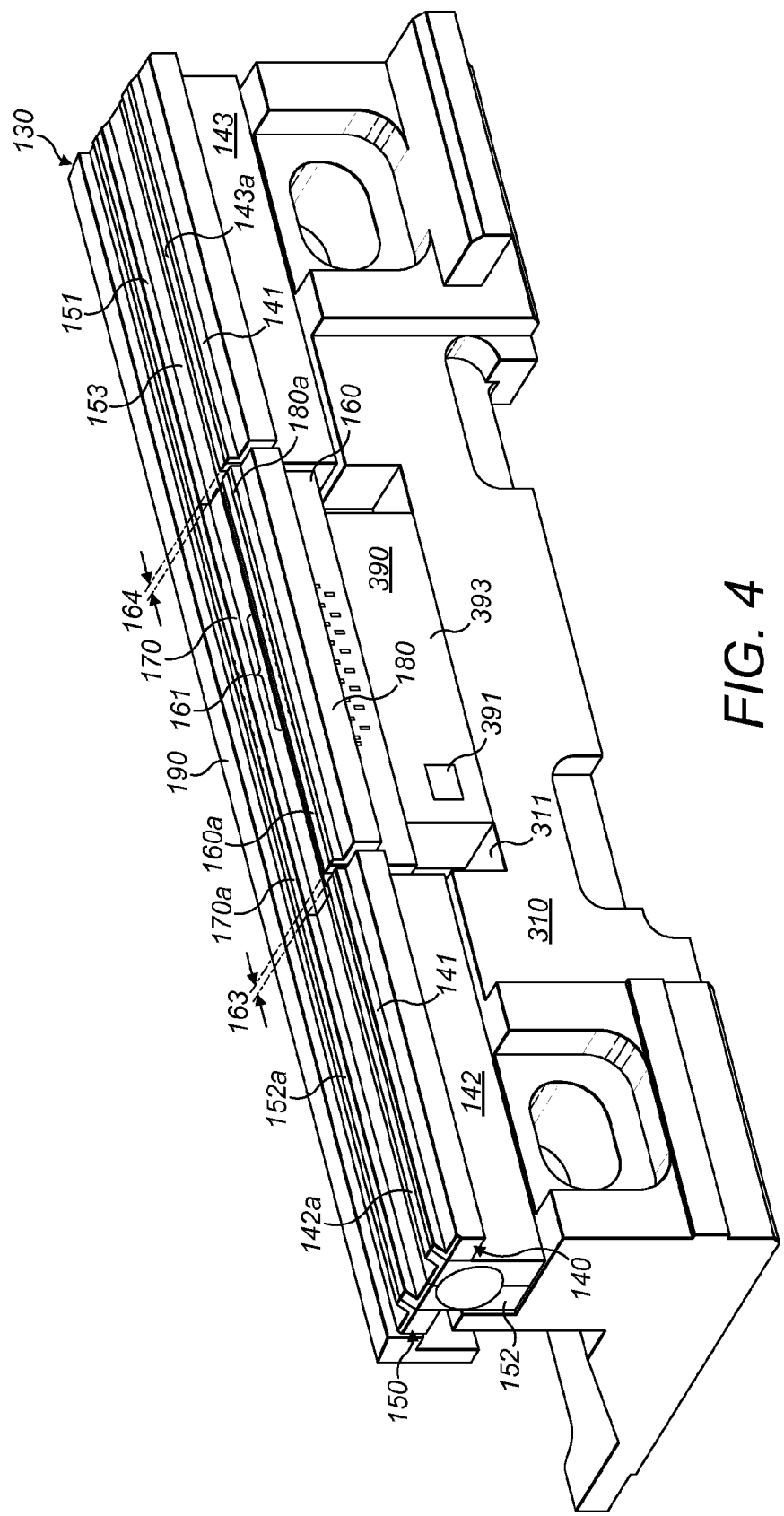
FIG. 4 is a perspective view showing portions of the transducer head assembly of FIG. 3, with the cover bar shown.
Figure 5:
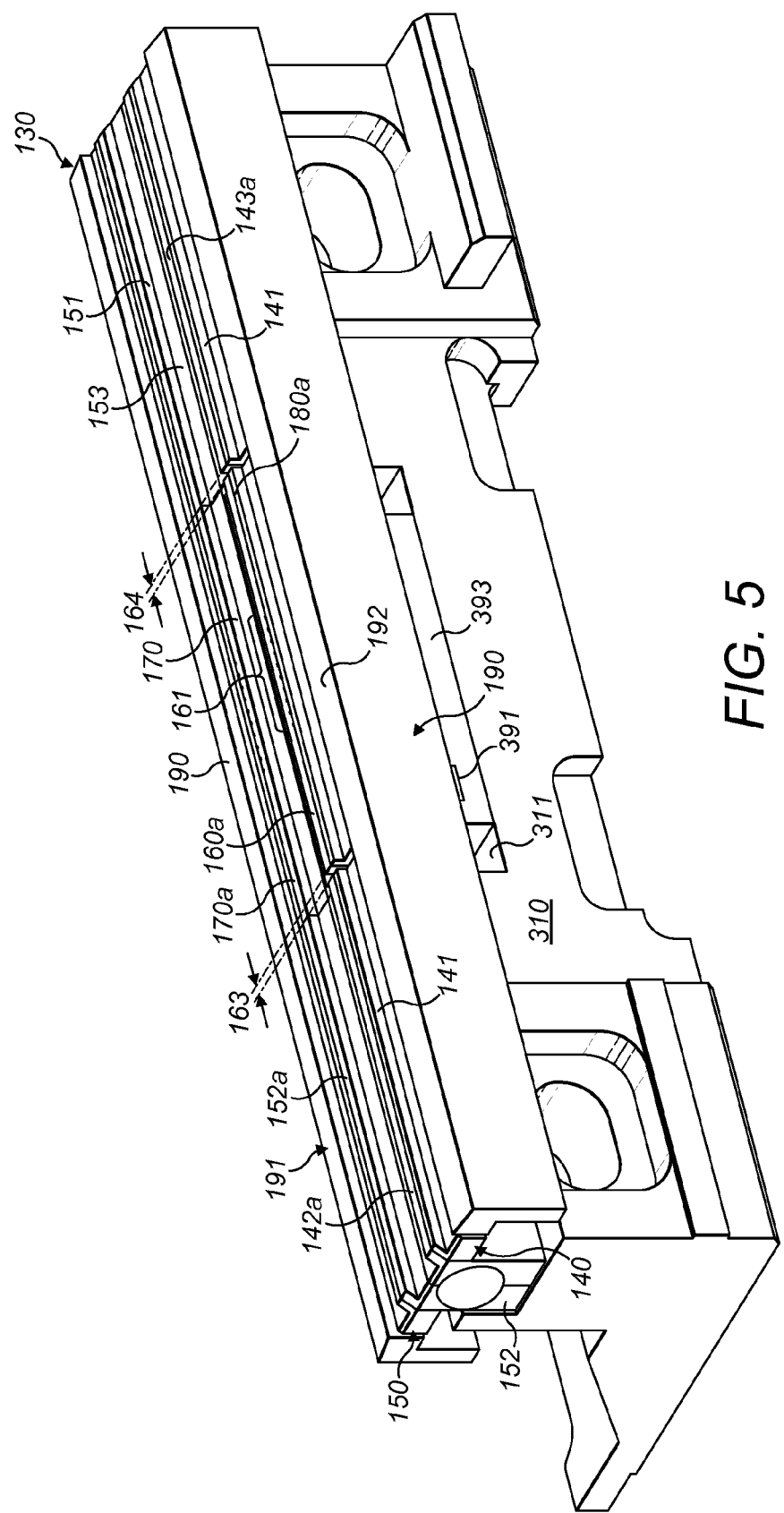
FIG. 5 is a perspective view showing portions of the head assembly of FIGS. 3 and 4, with the outrigger and cover bar shown.

An exemplary embodiment of the transducer head assembly 130 is shown in FIGS. 3, 4 and 5. The transducer head assembly 130 comprises first and second transducer head modules 140, 150. The head modules 140, 150 include respective first and second head element blocks 160, 170 comprising respective first and second arrays 161, 171 of transducer elements, or head elements, 161a to 161j and 171a to 171j (FIG. 6), extending in the longitudinal direction of the modules 140, 150. The head elements 161a to 161j, 171a to 171j are communicatively connected to respective connectors, for example in the form of conductive pads, collectively shown as 162 in FIG. 3, of the head element blocks 160, 170, which pads are in turn communicatively connected to respective conductive wires of a flexible cable, for passing electrical signals between the head elements 161a to 161j, 171a to 171j and signal processing circuitry 220, 221 of the tape drive 110. The head modules 140, 150 are supported by a carrier structure 310 of the transducer head assembly 130, the carrier structure being operably connectable to the head assembly actuator 131 to enable longitudinal displacement of the head assembly 130 to align the head elements 161a to 161j and 171a to 171j with data tracks on the media 120, as described in further detail below. The head modules 140, 150 comprise first and second respective bumps, or rails, 141, 151 extending in a longitudinal direction along the head modules.

Respective media bearer elements 142 and 143, comprising rail end portions of the first head module 140, are fixed relative to the carrier structure 310 adjacent respective opposite longitudinal end portions of the first head element block 160. Respective forward facing (that is, media facing, and facing upwardly as shown in FIGS. 3 to 5) surfaces 142a, 143a of the media bearer elements 142, 143 are configured and adapted to engage and support a data-carrying face of the media 120, thereby providing media bearer surfaces 142a, 143a to facilitate relative movement between the media 120 and the head assembly 130. The first head element block 160 is disposed longitudinally between the media bearer elements 142, 143 so as to provide room for longitudinal displacement of the first block 160 relative to the media bearer elements 142, 143. For example, as shown in FIG. 3, the block 160 is disposed centrally between the rail end portion 142 and the rail end portion 143, providing laterally and longitudinally extending gaps 163, 164 between longitudinally outwardly directed opposite end faces of the block 160 and respective proximal longitudinally inwardly directed end faces of the end rail portions 142, 143. A forward facing (media facing, facing upwardly as shown in FIGS. 3 to 5) surface 160a of the block 160 is configured and adapted to engage and support the data-carrying face of the media 120, and to provide a further media bearer surface 160a substantially aligned with the media bearer surfaces 142a, 143a of the media bearer elements 142, 143. A further media bearer element 180 is fixed for movement with the block 160, for example by bonding to the block 160. The further media bearer element 180 comprises a forward facing (media facing, facing upwardly as shown in FIG. 4) surface 180a that is aligned with and continues the media bearer surface 160a of the block 160. The media bearer surfaces 142a, 143a, 160a and 180a are mutually aligned so as to provide a substantially contiguous media bearer surface of the rail 141 of the first module 140, for supporting the data-carrying face of the media 120 a predetermined distance from the head elements 161a-j of the array 161. As shown for example in FIG. 3, the head elements 161a-j are disposed on the block 160 at a predetermined location that determines the distance of the head elements 161a-j from the media bearer surface 142a, 143a, 160a, 180a of the first rail 141.

The second head module 150 comprises a media bearer element 152 fixed relative to the carrier structure 310. The media bearer element 152 comprises a forward facing (media facing, facing upwardly as shown in FIGS. 3 to 5) surface 152a configured and adapted to engage and support the data-carrying face of the media 120, and provides the second head module with a media bearer surface 152a to facilitate relative movement between the media 120 and the head assembly 130. The media bearer element 152 of the second head module 150 extends longitudinally of the second rail 151, and the second head element block 170 is disposed longitudinally between laterally extending end portions of the media bearer element 152. In the present embodiment, the second head element block 170 is fixed relative to the carrier 310 and the media bearer element 152. A forward facing (media facing, facing upwardly as shown in FIGS. 3 to 5) surface 170a of the block 170 is configured and adapted to engage and support the data-carrying face of the media 120, and to provide a further media bearer surface 170a substantially aligned with the media bearer surface 152a. The media bearer surfaces 152a and 170a are mutually aligned so as to provide a substantially contiguous media bearer surface of the rail 151 of the second module 150, for supporting the data-carrying face of the media 120 a predetermined distance from the head elements 171a-j of the array 171a-j. The head elements 171a-j are disposed on the block 170 at a predetermined distance from the media bearer surface 152a, 170a of the second rail 151. Longitudinally extending outriggers 190, 191 (FIG. 5) may be fixedly mounted laterally outwardly of the respective modules 140, 150. The outriggers 190, 191 provide surfaces 192, 193 that are laterally outwardly spaced from the media bearer surfaces of the rails 141, 151, for example to facilitate control of the angle at which the data-bearing face of the tape 120 encounters the media bearer surfaces of the rails 141, 151.

Figure 6:
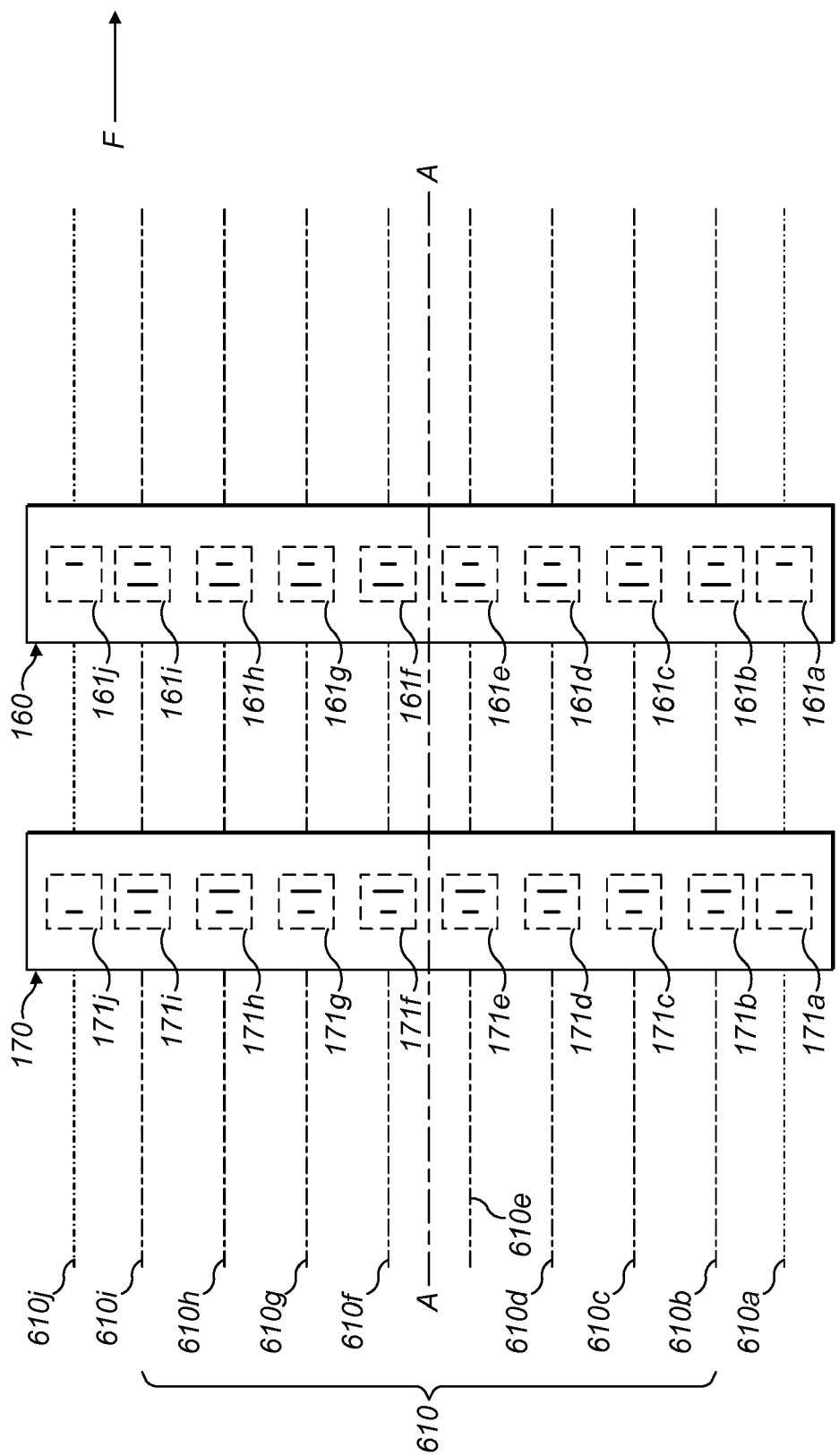
FIG. 6 is a schematic diagram illustrating dispositions of head elements of respective head element blocks of the head assembly of FIG. 3 with respect to a set of data tracks.

Each of the head elements 161b-i and 171b-i of the present embodiment comprises a read element stacked with a write element. For example, a magnetoresistive read element may be paired with an inductive write element. The read element may be narrower than the write element. The head elements 161b-i and 171b-i are operable to read and write data from and to a set 610 of concurrently written and/or read parallel data tracks 610b to 610i (FIG. 6) extending along the media 120. The relative dispositions of the data tracks 610b to 610i under normal operating conditions are indicated in FIG. 6 by showing the track center lines. The longitudinally outermost head elements 161a, 161j, 171a, 171j of the arrays 161, 171 respectively comprise a read element, for example a magnetoresistive read element, that is used as a servo element to read data from pre-recorded servo tracks 610a and 610j indicated in FIG. 6 by showing the servo track center lines. The servo track data can be used to position the head elements 161b-i laterally of the main direction of tape movement (from tape reel to tape reel), relative to the set 610 of data tracks 610b-i, for example by aligning lateral centers of the head element blocks 160, 170 with a lateral center A-A (FIG. 6) of the data track set 610. The pre-recorded servo track data can be encoded, by way of non-limiting example, using sequential azimuthally inclined stripes as used in LTO (Linear Tape Open) technology, such as is described in the ECMA-319, Ultrium-1 format standard, which is hereby incorporated by reference herein in its entirety.

It will be appreciated that any convenient alternative servo arrangement could be employed, and that many alternative servo feedback arrangements will be apparent to the ordinarily skilled person. For example, at least some of the servo data could be interleaved in the data tracks instead of or in addition to using dedicated servo tracks, a smaller or larger number of read elements could function as servo elements, and other elements than the longitudinally outermost head elements could be employed to read servo information. Alternative head element arrangements are also contemplated, for example the head elements 161b-i could comprise read elements and the head elements 171b-i could comprise write elements, or each set of head elements 161b-i and 171b-i could comprise alternately interleaved read and write elements. Various further alternatives will be apparent to the ordinarily skilled person. It will further be appreciated that any convenient alternative head technology could be used, including non-magnetic media technology such as optical tape technology.

The transducer head assembly 130 further includes actuator apparatus operationally connected between the carrier structure 310 and the head element block 160, to provide a longitudinal force between the head element block 160 and the carrier structure 310. For example, the actuator apparatus comprises an actuator 390 in the form of a piezoelectric element. In the embodiments of FIGS. 3 to 5, the piezoelectric element is disposed between a rearwardly (away from the media 120, downwardly in the orientation shown in FIGS. 3 to 5) facing surface of the head element block 160 and a forward facing (towards the media 120, upwardly in the orientation shown in FIGS. 3 to 5) surface 311 of the carrier structure 310. A forward facing (towards the media 120, upwardly in the orientation shown in FIGS. 3 to 5) surface of the piezoelectric element 390 is fixed, for example bonded, to the rearwardly facing surface of the head element block 160, and an oppositely facing (away from the media 120, downwardly in the orientation shown in FIGS. 3 to 5) surface of the piezoelectric element 390 is fixed, for example bonded, to the forward facing surface 311 of the carrier structure 310. A bond pad 391, for example comprising a suitable electrically conductive material such as gold, is provided on a side 393 of the piezoelectric element 390 that extends transversely between the bonded surfaces of the piezoelectric element 390. The bond pad 391 is electrically connected, for example through a flexible cable (not shown) to a servo controller 210 of the tape drive 110 via any suitable electronic interface 211. The piezoelectric element 390 can be electrically controlled through the bond pad 391 to provide the longitudinal force in a longitudinally acting shear mode to move the head element block 160 relative to the media bearer elements 142, 143, as indicated by arrow 133 in FIG. 2.

As shown in FIG. 2, the exemplary tape drive 110 includes functional elements including: a host interface 205 operable to provide data communications with an input/output (I/O) bus or interconnect 203 for receiving data from at least one data source such as a host computer; a formatter 206 with at least one data buffer, operable to buffer and digitally process the received data into and from a suitable format for sequential storage; and read/write processing circuitry 221 and preamplifier circuitry 220 for converting the formatted data between digital and analog form, and conditioning the analog data signals that flow to and from the transducer head elements of the head element arrays 161, 171. The broad arrows 230, 231, 232, 233 indicate the data path between functional elements in different stages of processing of the data. Arrows between functional elements using narrow lines indicate control signal channels.

The exemplary tape drive 110 further includes servo controller 210 which communicates through appropriate interface electronic circuitry 211 with tape reel drive motors 240 and tape reel speed sensors 241 for controlling the longitudinal speed and position of the tape 120. The servo controller 210 further communicates through the interface circuitry 211 with the head assembly actuator 131 and the head element block actuator 390, for controlling the position of the head element arrays 161, 171 laterally of the tape 120. The servo controller 210 receives at least one servo signal from the respective head arrays 161, 171, for example via preamplifier circuitry 220 and a flexible cable attached to the head element blocks 160, 170. The servo controller can also provide a clock signal to the read/write processing circuitry 221, for example using information contained in the servo signal. A tape drive controller 245 is operable to provide overall control of the tape drive 110, including the servo controller 210 and the formatter 206.

Whilst not apparent from FIG. 6, the channel pitch (distance measured in the longitudinal direction of the arrays 160, 170 between center lines of the head elements 161$b$-$i$ and 171$b$-$i$) is substantially greater than the track pitch (distance measured in a lateral direction of the tape 120 between adjacent data tracks). A plurality of further data track locations (not shown), locatable using information in the servo tracks, is disposed between each of the data tracks 610$b$-$i$ of a data set 610. FIG. 6 shows an arrangement using arrays of eight head elements 161$b$-$i$ and 171$b$-$i$ and sets 610 of eight concurrently written and/or read data tracks 610$b$-$i$. It will be appreciated that the channel count (head element count) and data track count could be much larger than eight, for example sets of 16 or 32 data tracks could be concurrently written and/or read, necessitating a head span of approximately 1.6 mm or 3.2 mm. The greater the head span, the greater the risk that a given level of expansion or contraction of the tape in the lateral direction of the tape will cause problematic misalignment of the laterally outer data heads with their respective data tracks.

Figure 7:
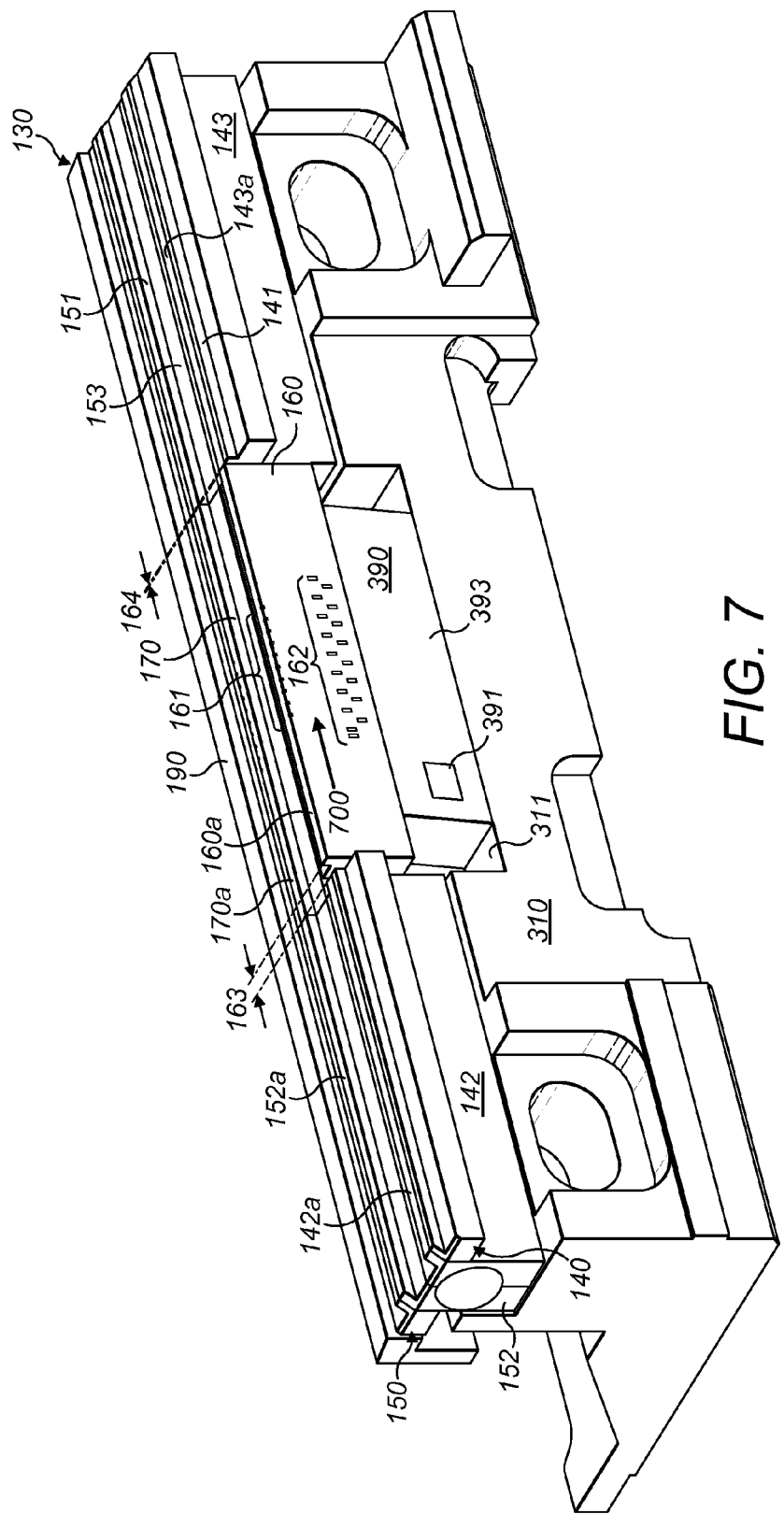
FIG. 7 shows the head assembly of FIG. 3, the head element block having been moved by an actuator.
Figure 8:
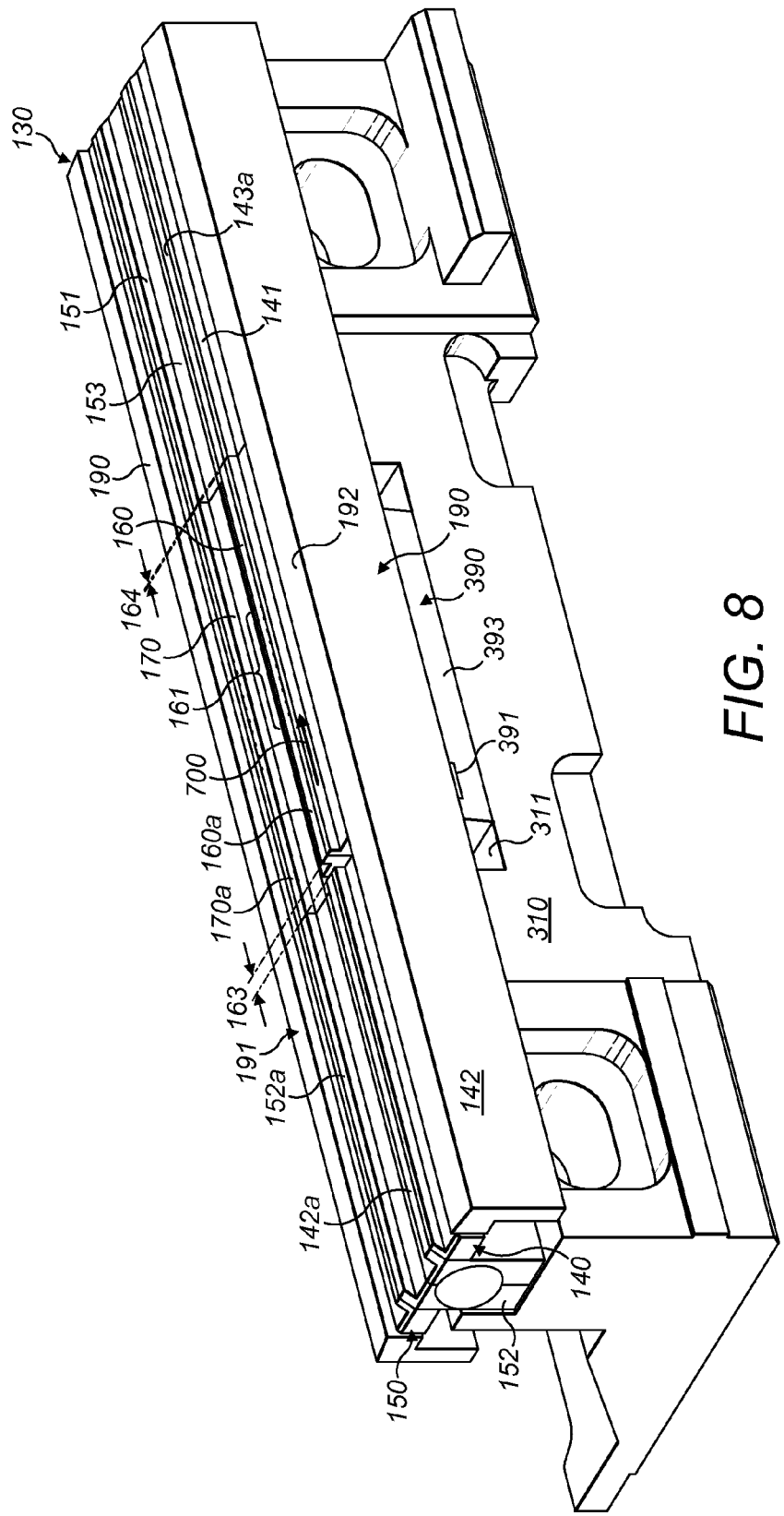
FIG. 8 shows the head assembly of FIG. 5, the head element block having been moved by an actuator.
Figure 9:
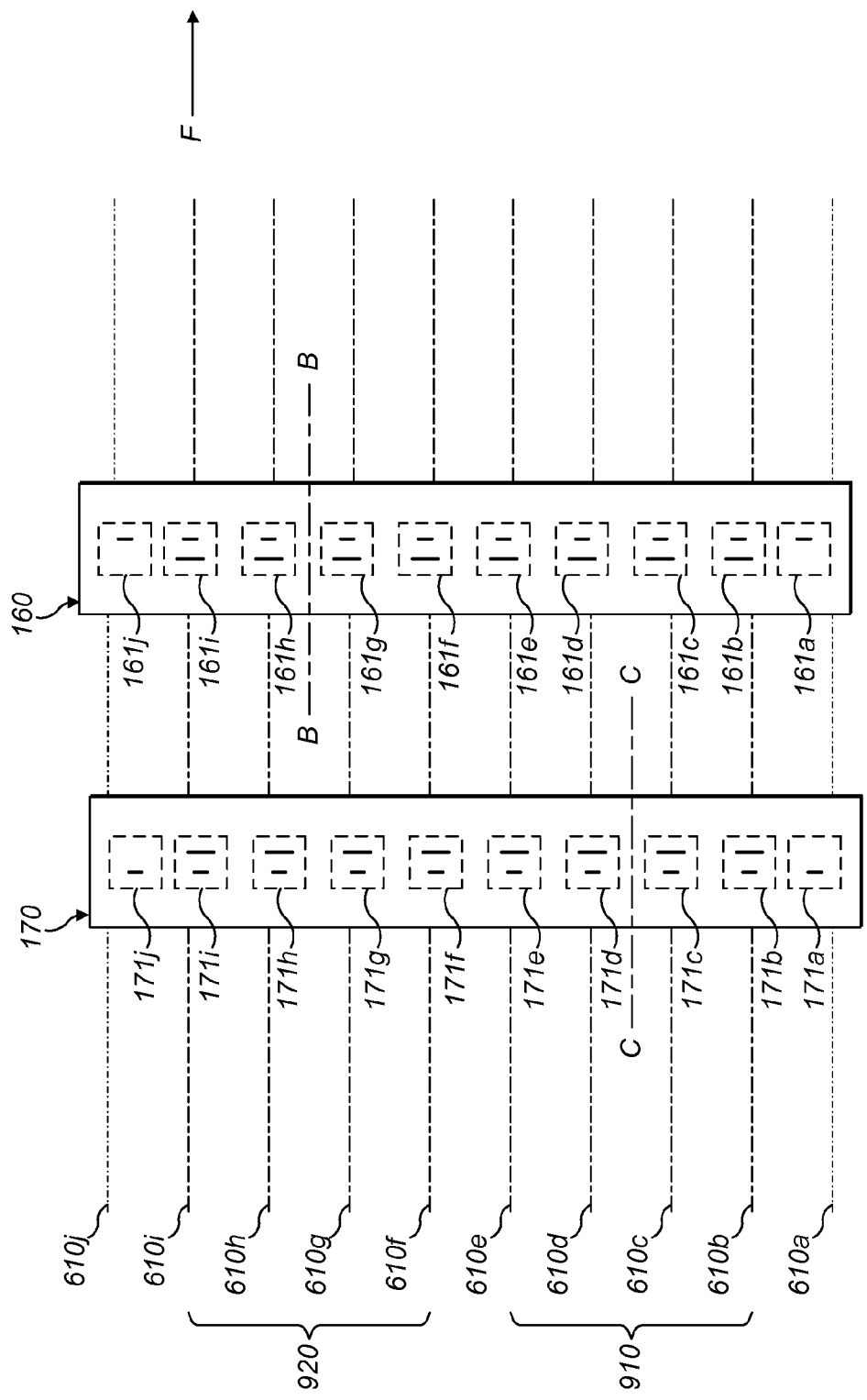
FIG. 9 is a schematic diagram similar to FIG. 6, the movable head element block having been moved.

FIG. 9 shows tracks 610$a$-$j$ the tape 120 under conditions of significant tape expansion. As illustrated in FIGS. 7 to 9, the servo controller 210 is operable to control both the head assembly actuator 131 and the head element block actuator 390 to laterally align a lateral center of a first head element subset 161$f$-$i$, for example an upper half of the data read and/or write head elements of the movable head element block 160, with a lateral center B-B of a first data track subset 920, for example comprising an upper half of the track set 610, and to laterally align a lateral center of a second head element subset 171$b$-$e$, for example a lower half of the data read and/or write head elements of the further head element block 170, with a lateral center C-C of a second data track subset 910, for example comprising a lower half of the track set 610. As best seen in FIG. 7, the head element block 160 has been moved in the direction of arrow 700 by actuation of the piezoelectric element 390 in shear mode, reducing or closing the gap 164 and extending the gap 163. In some embodiments, the head element block actuator 390 provides head element block 160 movement relative to the carrier 310 of the order of up to about 1 μm in a direction laterally of the tape 120.

Under the tape expansion conditions described above, the tape drive controller 245 causes the tape drive 110 to process data relating to the first and second head element subsets 161$f$-$i$ and 171$b$-$e$, and to discard data relating to other read and/or write head elements. A reduction is facilitated in the maximum potential misalignment of active data read and/or write head elements with their respective data tracks, for example the amount of misalignment of the laterally outer data read and/or write head elements 171$b$ and 1611 relative to the respective laterally outer data set tracks 610$b$ and 610$i$. For example, in read mode with the tape 120 moving in a forward direction F, data is concurrently read from the second track subset 910 by the lead head element block 170 and from the first track subset 920 by the trailing head element block 160. While it is no longer possible to use the leading and trailing head elements to provide read after write capability, it is now facilitated, for example, to read data in conditions where this might not otherwise be possible. Also, in write mode, data can be written such that it is more easily recoverable in normal tape dimensional operating conditions. In alternative embodiments, the further head element block 170 may be provided with a respective further head element block actuator, and be movable relative to the fixed media bearer element 152 of the further head element module 150. In some embodiments, values relating to track spacing during writing and/or reading are stored to a predetermined location on the tape media, for use during subsequent tape access to facilitate alignment of read/write heads with recorded data tracks.

In some embodiments, under lateral contraction conditions of the tape 120, the head element block 160 may be moved in the opposite direction to that shown in FIG. 9 relative to the head element block 170, that is, downwardly in the orientation shown in FIG. 9, to align the lateral centers of the head element blocks 160, 170 respectively with the lateral centers of the first and second track subsets 920, 910. In an alternative mode of handling lateral contraction conditions of the tape, with the head element block 160 moved upwardly as shown in FIG. 9, head element subset 171$f$-$i$ of head element block 170 is brought into alignment with the first track subset 920 and head element subset 161$b$-$e$ is brought into alignment with the second track subset 910, and data relating to the remaining data read and/or write heads 171$b$-$e$ and 161$f$-$i$ is discarded.

The piezoelectric element 390 is maintained by a neutral control signal in a neutral position, in which the head elements of the head element blocks 160, 170 are in mutual alignment. The neutral control signal may be a voltage control signal, for example 0 volts, applied to the bond pad 191. The neutral position may be as shown in FIG. 3, where the gaps 163, 164 adjacent opposite longitudinal ends of the head element block 160 permit longitudinal movement of the block 160 in either direction. In this case, a negative or a positive voltage may be selectively applied to cause the piezoelectric element 390 to shear in either direction as desired. In alternative embodiments, the head element block 160 may be maintained in the neutral position by applying a positive or negative voltage, and/or may be movable in only one direction from the neutral position. In some embodiments, an alternative piezoelectric device may be provided that operates by expansion and/or contraction and/or bending, instead of in shear mode.

The drive controller 245 and/or servo controller 210 initiate the above-described relative movement of the head element blocks 160, 170, and the reading or writing of a data track set using respective head element subsets of the blocks 160, 170, for example in response to detecting that read after write error conditions reach or exceed a predetermined threshold, and/or in response to detection by the servo controller 210 of a predetermined amount of lateral contraction or expansion of a tape 120. In some embodiments, the tape drive 110 is configured to normally operate using only subsets of head elements in the leading and trailing blocks 160, 170, and further pairs of head element blocks could be provided for example to provide read after write capability. In some embodiments, smaller head element subsets could be used, distributed over a greater number of modules with respective movable head element blocks.

In further alternative embodiments, at least one further head element block may be provided in mutual longitudinal alignment with a movable head element block in the same rail. For example, portions of an alternative transducer head assembly 1130 are shown in FIGS. 10 to 13. The transducer head assembly 1130 comprises first and second transducer head modules 1140, 2140. The head modules in 1140, 2140 include arrays of transducer head elements 1161a-j and 2161a-j (FIG. 12) extending in the longitudinal direction of the modules 1140, 1240. The head elements 1161a-j and 2161a-j are communicatively connected to respective connectors collectively shown as 2162 similar to the connectors 162 of the embodiment of FIG. 3. The head modules 1140, 2140 are supported by a carrier structure 1310 operably connected to the head assembly actuator 131 (FIG. 1). The head modules 1140, 2140 comprises first and second respective longitudinal bumps, or rails, 1141, 2141.

The first head module 1140 comprises media bearer elements 1142 and 1143, that are fixed relative to the carrier structure 1310, and provide respective forward facing media bearer surfaces. Mutually adjacent respective fixed and movable head element blocks 1170, 1160 are disposed longitudinally between portions of the media bearer elements 1142, 1143 so as to provide room for longitudinal displacement of the movable block 1160. A further media bearer element 1180 is fixed for movement with the block 1160. Forward facing media bearer surfaces of the media bearer elements 1142, 1143, 1180 and the blocks 1170, 1160 provide a substantially contiguous media bearer surface of the rail 1141. The fixed head element block 1170 comprises an array of head elements 1161a-e, and the movable head element block 1160 comprises an array of head elements 1161f-j, the head elements 1161a-j of the fixed and the movable blocks 1170, 1160 being in mutual longitudinal alignment.

The second head module 2140, similarly to the first head module 1140, comprises media bearer elements 2142 and 2143, that are fixed relative to the carrier structure 1310, and provide respective forward facing media bearer surfaces. Mutually adjacent respective fixed and movable head element blocks 2170, 2160 are disposed longitudinally between portions of the media bearer elements 2142, 2143 so as to provide room for longitudinal displacement of the movable block 2160. A further media bearer element 2180 is fixed for movement with the block 2160. Forward facing media bearer surfaces of the media bearer elements 2142, 2143, 2180 and the blocks 2170, 2160 provide a substantially contiguous media bearer surface of the rail 2141. The fixed head element block 2170 comprises an array of head elements 2161a-e, and the movable head element block 2160 comprises an array of head elements 2161f-j, the head elements 2161a-j of the fixed and the movable blocks 2170, 2160 being in mutual longitudinal alignment. Longitudinally extending outriggers 2190, 2191 are fixedly mounted laterally outwardly of the respective modules 1140, 2140. The outriggers 2190, 2191 provide forward facing surfaces that are laterally outwardly spaced from the media bearer surfaces of the rails 1141, 2141, for example to facilitate control of the angle at which the data-bearing face of the tape 120 encounters the media bearer surfaces of the rails 1141, 2141.

Figure 10:
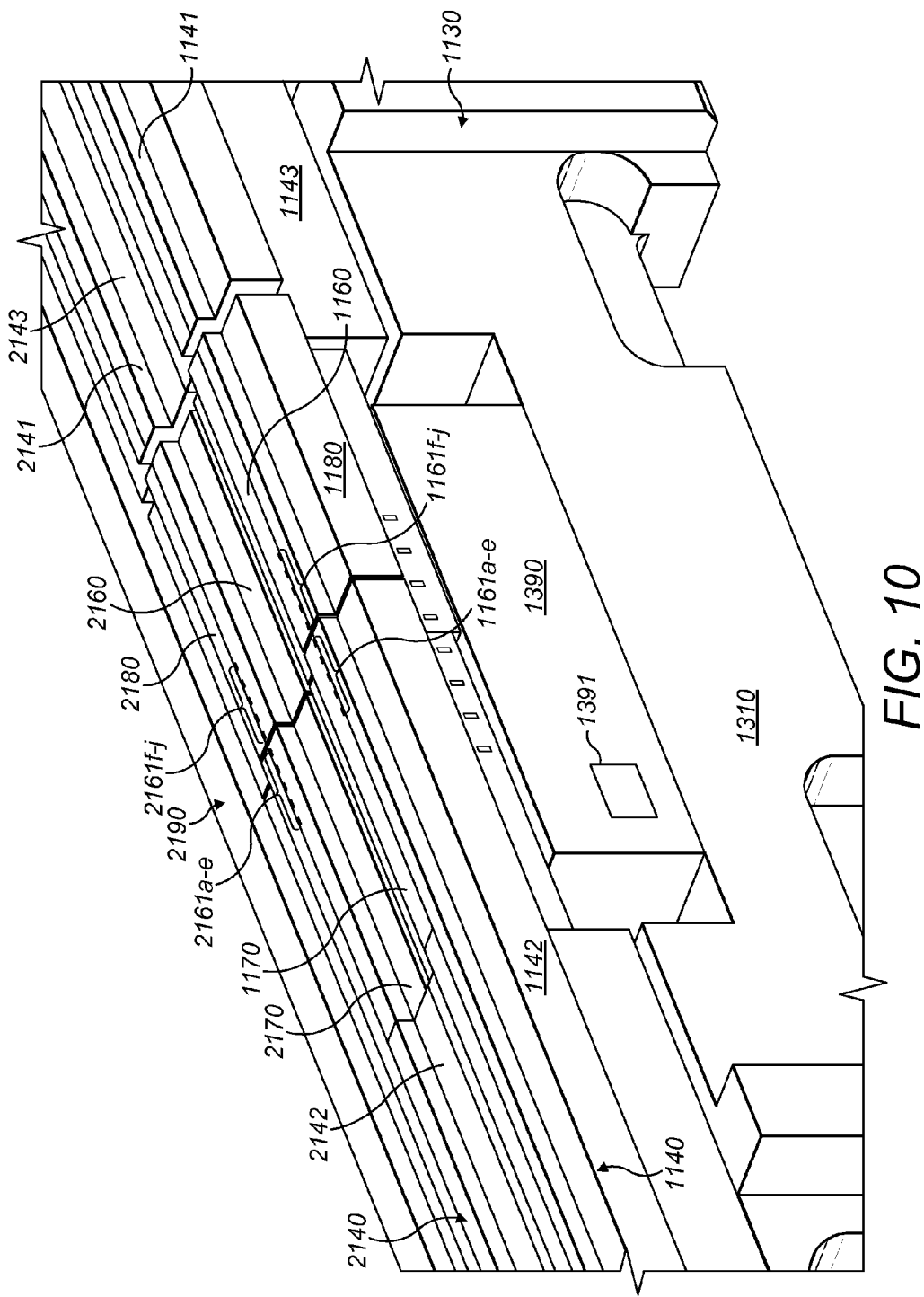
FIG. 10 is a perspective view showing portions of an alternative transducer head assembly having two movable head element blocks, with an outrigger removed.

As best seen in FIG. 10, an actuator in the form of a piezoelectric element 1390 is fixed, for example by bonding, on one side thereof to the movable block 1160 of the first module 1140, and on an opposite side to the carrier 1380. The piezoelectric element 1390 is controllable by the servo controller 210 to move the movable block 1160 of the first module 1140 longitudinally from the position shown in FIGS. 10 and 12 to the position shown in FIGS. 11 and 13. In some embodiments, a further piezoelectric element (not shown) is fixed to the movable block 2160 of the second module 2140 to facilitate independent servo control of the movable block 2160. In alternative embodiments, the piezoelectric element 1390 may be fixed to both movable blocks 1160, 2160 of the first and second modules 1140, 2140 so as to move the movable blocks 1160, 2160 together.

Figure 11:
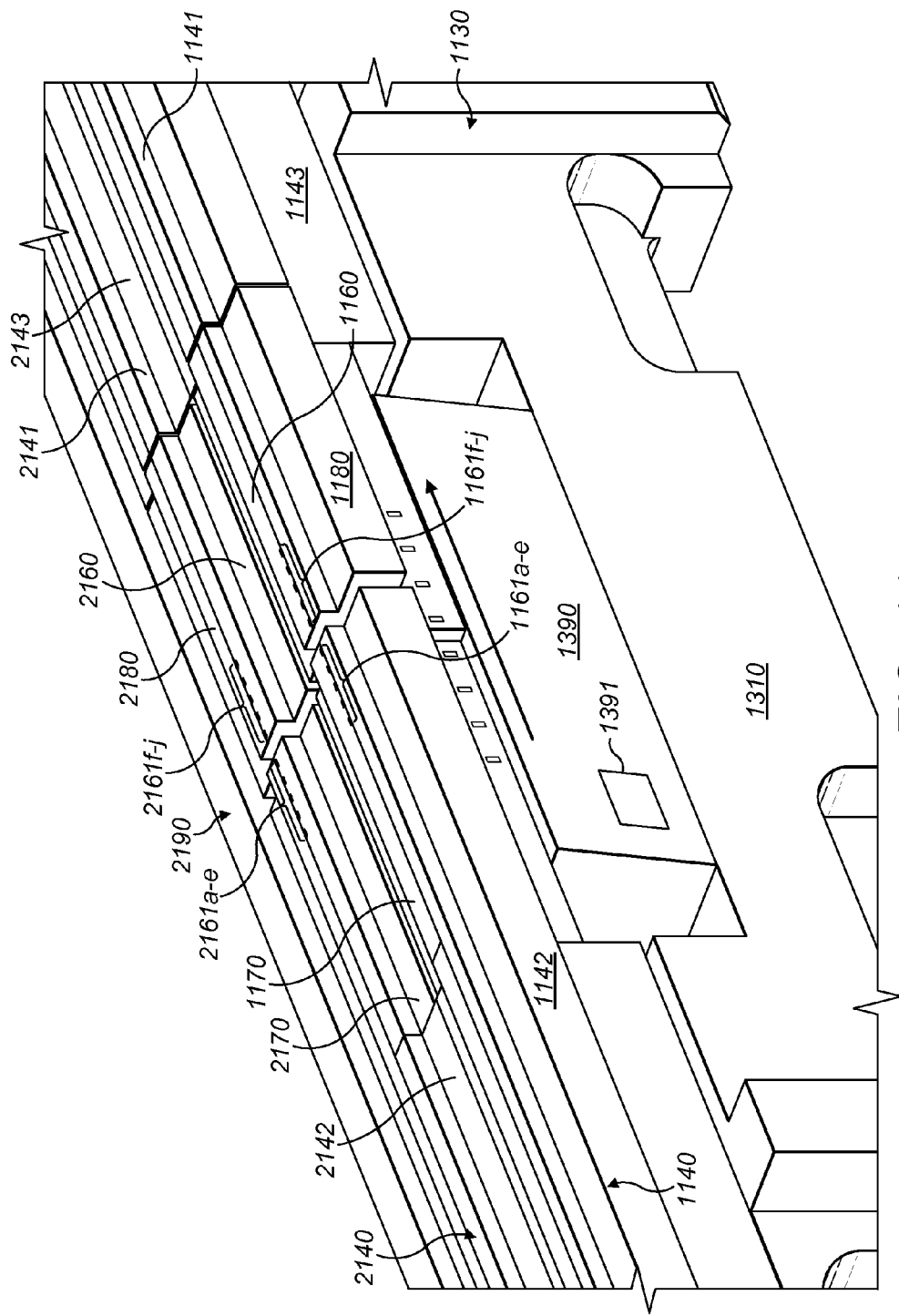
FIG. 11 shows the head assembly of FIG. 10, the head element blocks having been moved by an actuator.
Figure 12:
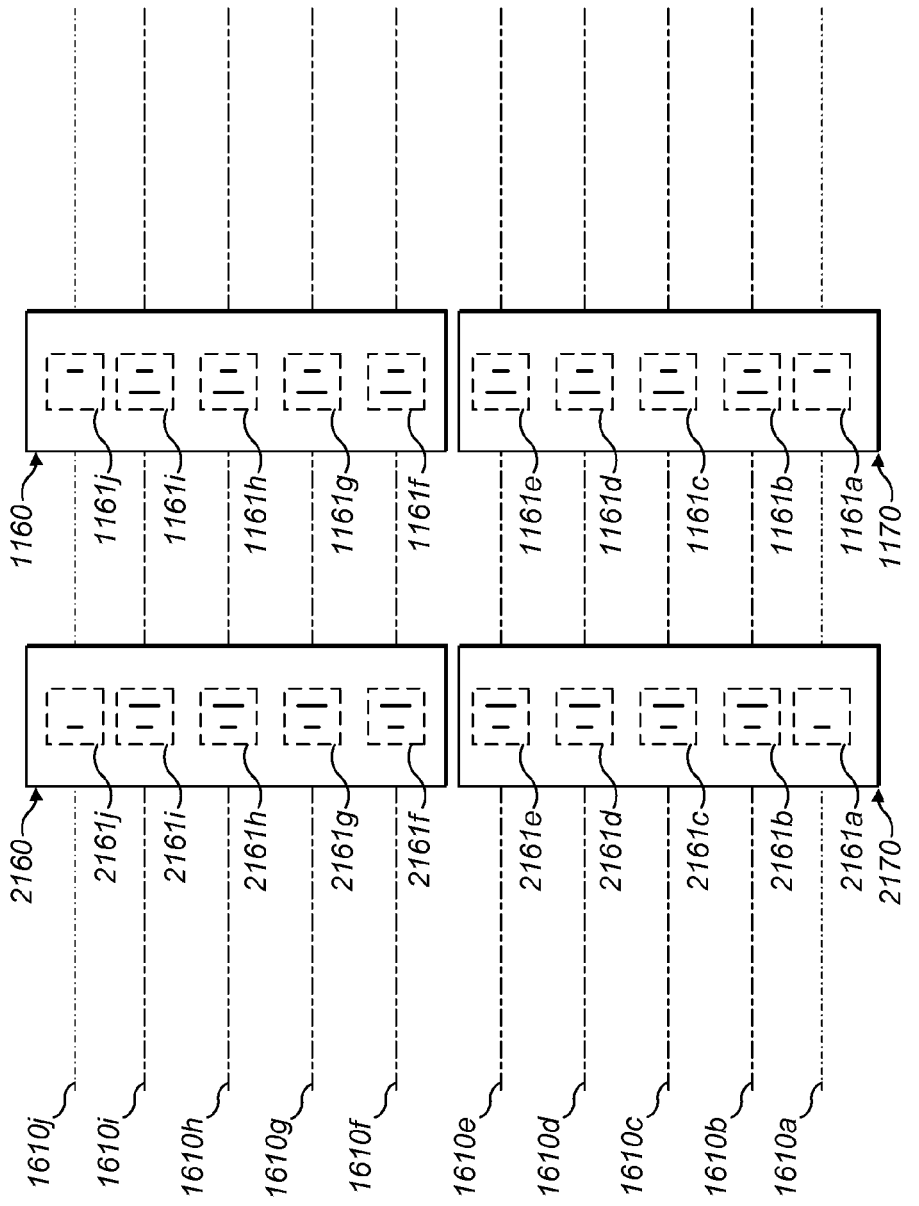
FIG. 12 is a schematic diagram illustrating dispositions of head elements of respective head element blocks of the head assembly of FIG. 10 with respect to a set of data tracks.
Figure 13:
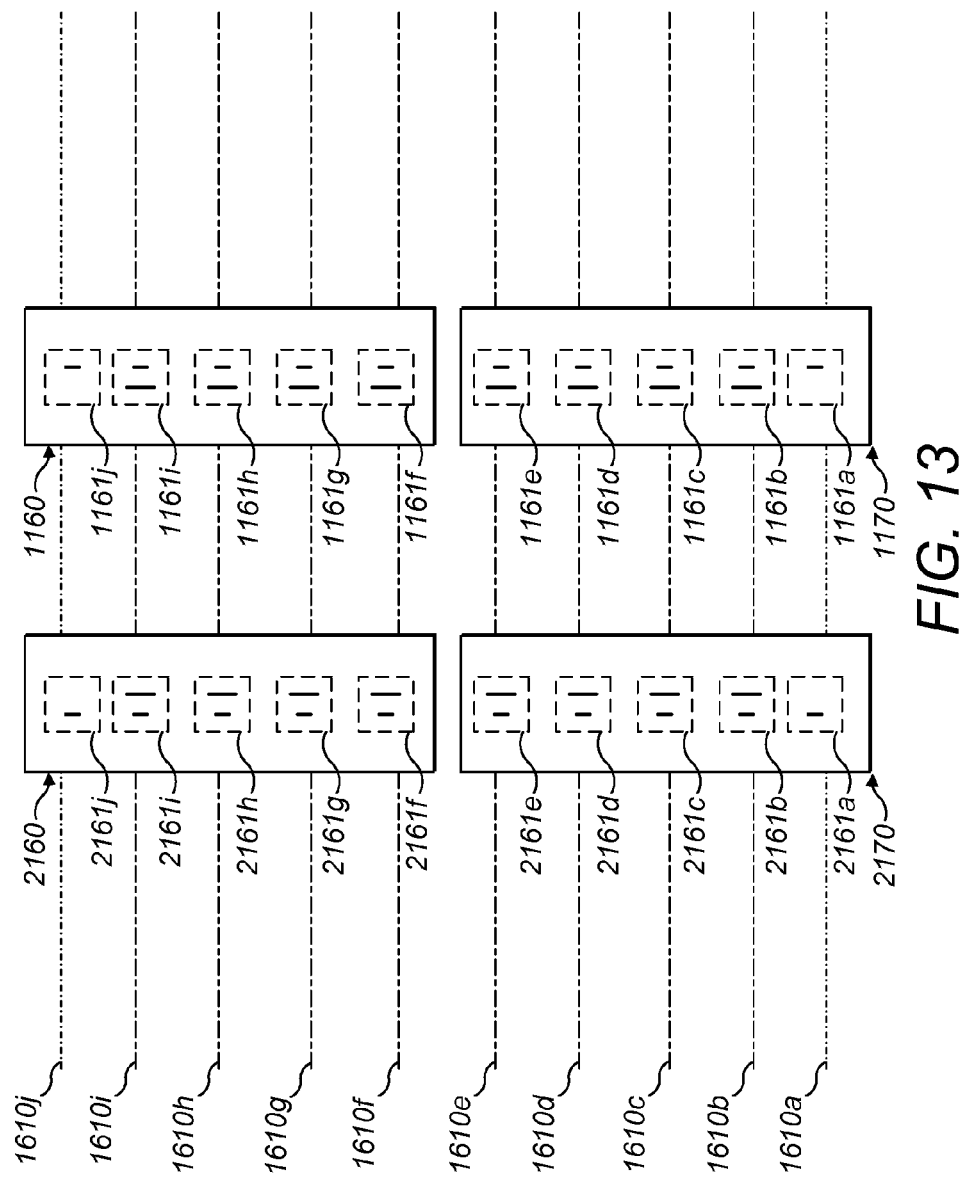
FIG. 13 is a schematic diagram similar to FIG. 12, the movable head element blocks having been moved.

FIG. 12 illustrates respective nominal track center lines of a set of data tracks 1610b-i and two laterally outwardly disposed servo tracks 1610a, 1610j under normal conditions of tape dimensional stability. In the neutral position of FIGS. 10 and 12 the fixed data read and/or write head elements 1161b-e, 2161b-e are aligned relative to a first subset 1610b-e of the set of data tracks, and the movable data read and/or write head elements 1161f-i, 2161f-i are aligned relative to a second subset 1610f-i of the set of data tracks. FIG. 13 represents a laterally expanded condition of the tape 120 in which the distance between tracks of the track set 1610b-i is increased. FIG. 11 shows the actuator 1390 in an actuated condition in which the movable block 1160 has been moved longitudinally away from the relatively fixed block 1170. The servo controller 210, under control of the tape drive controller 245, controls the head assembly actuator 131 and the head element block actuator 1390 as appropriate, to align the fixed data read and/or write head elements 1161b-e, 2161b-e relative to the first data track subset 1610b-e, and the movable data read and/or write head elements 1161f-i, 2161f-i relative to the second data track subset 1610f-i in the expanded condition of the tape. In the present embodiment, data can be obtained and processed from all the read and/or write heads of the first and second modules 1140, 2140, and read after write functionality can be maintained in the expanded condition of the tape.

In some embodiments, the position of the movable blocks 1160, 2160 shown in FIG. 10 is used in laterally contracted tape conditions, and a longitudinally central position of the movable blocks may be used for the neutral condition. As described above in relation to the embodiment of FIGS. 3 to 9, various further alternatives for configuring and controlling the piezoelectric element 1390 are available. The drive controller 245 and/or servo controller 210 may initiate head element block movement, for example in response to read after write error conditions exceeding a predetermined threshold, and/or in response to detection by the servo controller 210 of a predetermined amount of lateral contraction or expansion of a tape 120, or may control head element block movement to optimise alignment of read and/or write head elements relative to data tracks during normal operation. In still further alternative embodiments, at least one further movable head element block may be provided in mutual longitudinal alignment with the movable head element block 1160, 2160 in the same rail.

Figure 14:
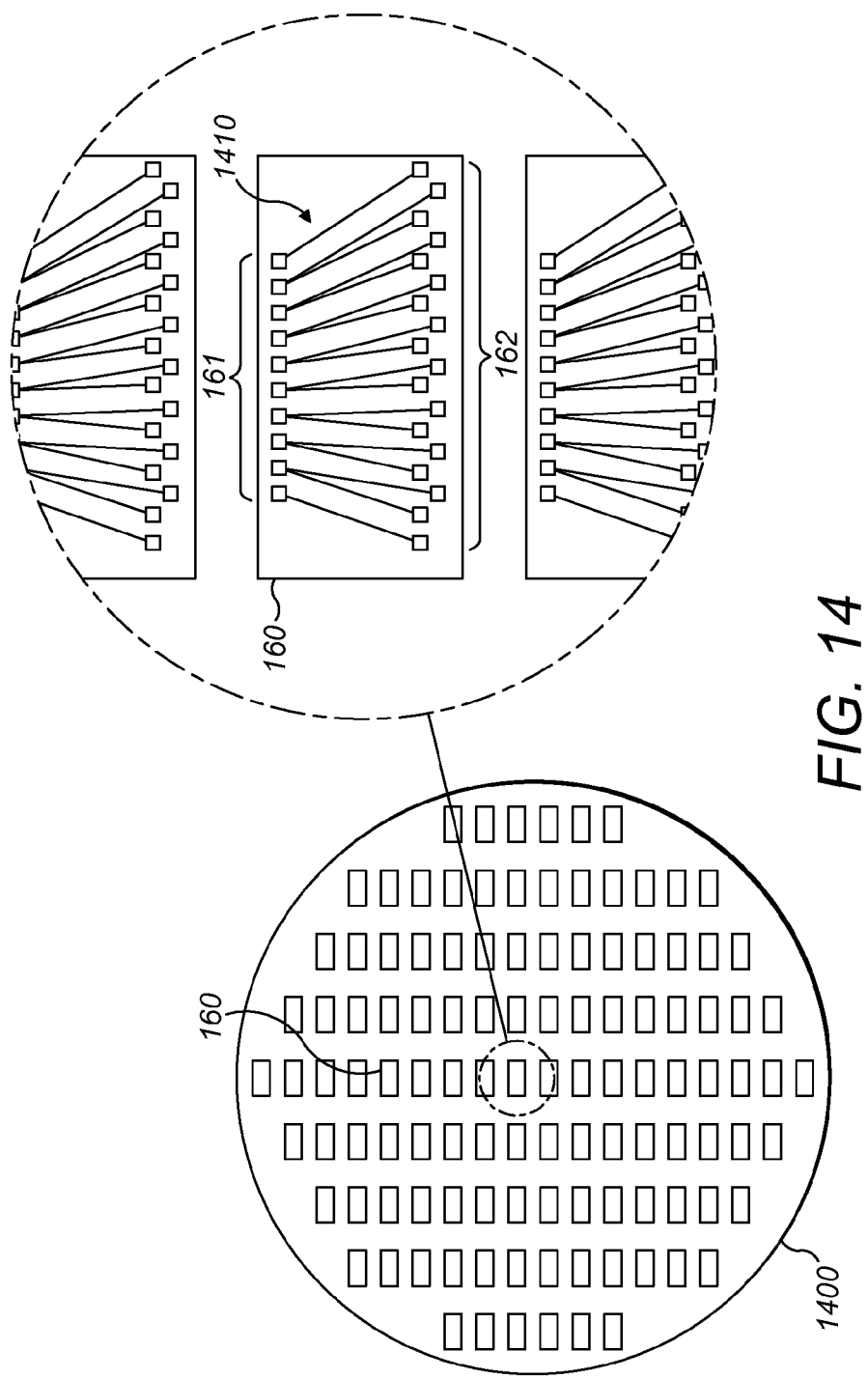
FIG. 14 illustrates a head element block in the form of an integrated circuit chip formed from a silicon-based wafer.
Figure 15:
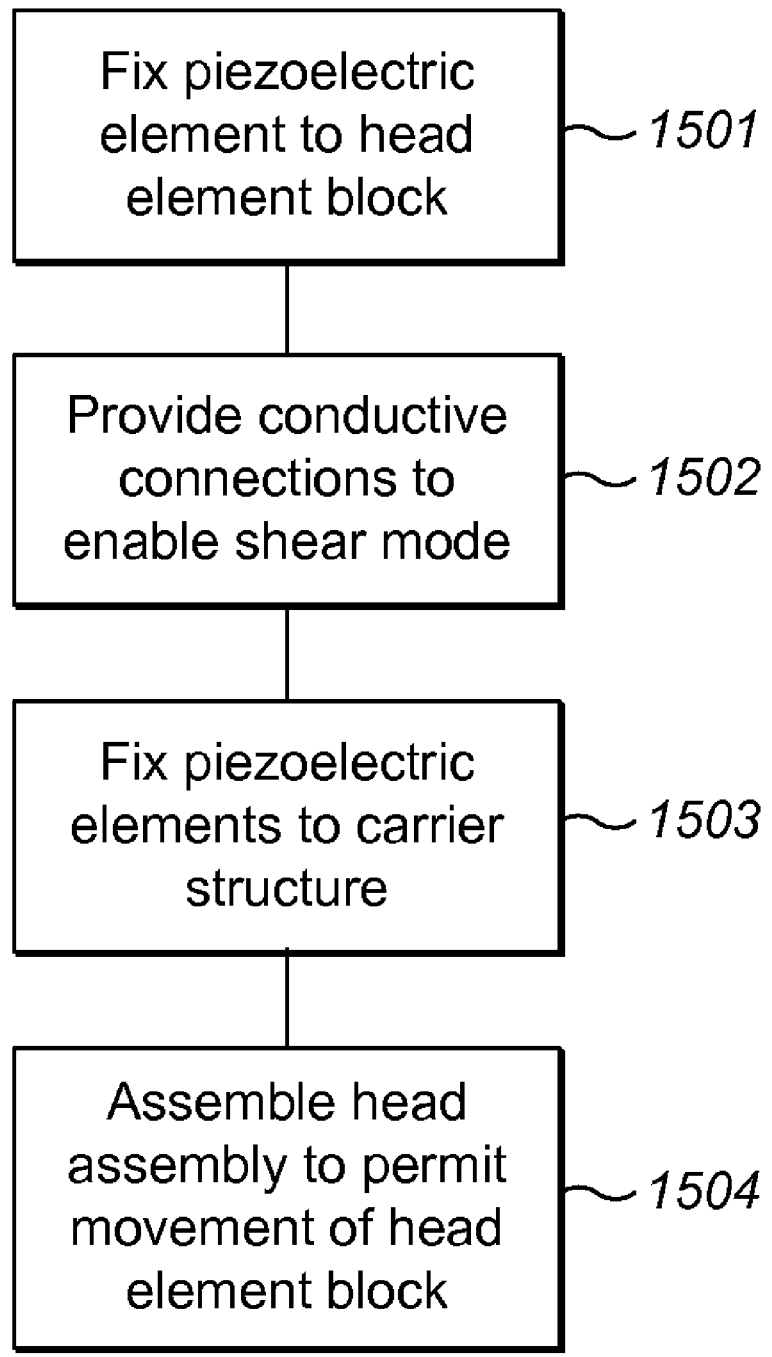
FIG. 15 is a flow diagram illustrating a method of making a transducer head assembly.

The transducer head element block 160 of the embodiments of FIGS. 3 to 9 may be provided in the form of an integrated circuit chip comprising circuitry 1410 (FIG. 14) defining the transducer head element array 161, connectors 162 for connecting to a flexible circuit that in turn connects to the tape drive read/write processing circuitry, and conductive interconnections between the head elements of the array 161 and the respective connectors 162. Head element blocks 160 may be fabricated in bulk, for example on a silicon-based wafer 1400. Such fabrication requires little or no change from present fabrication processes. The configuration of the carrier 310 may need to be adapted to physically accommodate the actuator 390. The main additional steps in making the exemplary transducer head assembly are to fix the head element block 160 to the actuator 390 and to provide the head element block 160 with electrical connections. The exemplary piezoelectric actuator 390 is particularly convenient to fix, for example by bonding, on one side thereof to the head element block 160 (step 1501, FIG. 15) and on an opposite side thereof to the carrier 310 (step 1503, FIG. 15), to provide with electrical connections to operate in shear mode (step 1502, FIG. 15), and to assemble with the head element block 160 on the carrier 310 to permit movement of the head element block 160 in a direction of the shear axis (step 1504, FIG. 15). Where the head element block 160 comprises an integrated circuit chip, the piezoelectric element 390 may be bonded directly to the chip. In the embodiment of FIGS. 10 to 13, additional fabrication steps are necessary. As each chip on the wafer 1400 has fewer head elements, additional space on the wafer is needed to provide for a saw kerf. An additional sawing step is necessary, and a possible additional lapping step to precisely set the distance between the longitudinally innermost head element and the end of chip at half the channel pitch.

The various functional elements of the tape drive 110 shown in FIG. 2 can be provided in any convenient form using any convenient combination of hardware circuitry, and/or software (including firmware) programmed processors. By way of non-limiting example, at least the host interface 205, drive controller 245, servo controller 210 and formatter 206 may be provided using one or more ASICs (application specific integrated circuits) having one or more respective microprocessors controlled by instructions stored in one or more instruction stores. One or more of the ASIC(s) conveniently comprises digital signal processing circuitry. The instruction store(s) conveniently comprise memory such as EEPROM flash memory, and the instruction store(s) may be embedded in or separate from the ASIC(s). Various aspects of the invention are implementable using any convenient data transfer device technology and data format.

The invention claimed is:

1. A transducer head assembly comprising:
a first head module comprising at least one media bearer element providing a media bearer surface to engage and support a data-carrying face of a media, and a first head element block having an array of transducer elements to read or write data on the media;
a second head module comprising a second head element block having an array of transducer elements to read or write data on the media;
a carrier structure to carry the first and second head modules; and
an actuator to move the first head element block relative to the second head element block and relative to the at least one media bearer element.

2. The transducer head assembly of claim 1, the actuator comprising a piezo electric element operable to provide a shearing action between the first head element block and the carrier structure.

3. The transducer head assembly of claim 1, the actuator extending between a rearwardly facing surface of the first head element block, and a forward facing surface of the carrier structure.

4. The transducer head assembly of claim 1, wherein the media bearer element is fixed with respect to the carrier structure.

5. The transducer head assembly of claim 4, wherein a gap is provided between the media bearer element and the first head element block, and wherein the actuator is to move the first head element block to extend the gap or shrink the gap.

6. Tape drive apparatus comprising:
first and second head element blocks comprising respective first and second longitudinally extending arrays of transducer head elements;
a carrier supporting the first and second head element blocks, the carrier being longitudinally displaceable to align head elements with tracks on a tape;
actuator apparatus operationally connected between the carrier and at least one of the head element blocks, to provide a longitudinal force between the at least one head element block and the carrier; and
a servo control circuit to control the actuator apparatus to cause relative longitudinal displacement between the blocks to enable alignment of head elements of the first array relative to a first sub-set of a set of tracks and concurrent alignment of head elements of the second array relative to a second sub-set of the set of tracks, the second subset being different from the first sub-set.

7. The tape drive apparatus of claim 6, the actuator apparatus comprising a piezo electric element electrically connected to provide a longitudinal shearing action.

8. The tape drive apparatus of claim 6, the actuator apparatus being operationally connected on one side thereof to a rearwardly facing longitudinally extending surface of the at least one head element block and on an opposite side thereof to a forward facing surface of the carrier.

9. The tape drive apparatus of claim 6, operable to write and/or read the first sub-set of tracks using head elements of the first array and to concurrently write and/or read the second sub-set of tracks using head elements of the second array.

10. The tape drive apparatus of claim 6, further operable to write and/or read the first sub-set of tracks using a sub-set of the head elements of the first array, and to concurrently write and/or read the second sub-set of tracks using a sub-set of the head elements of the second array, the head element blocks being arranged in respective first and second laterally offset bumps of the tape drive apparatus.

11. The tape drive apparatus of claim 6, further operable to write and/or read the first sub-set of tracks using the head elements of the first array, and to concurrently write and/or read the second sub-set of tracks using the head elements of the second array, the head element blocks of the first and second arrays being mutually longitudinally aligned in a bump of the tape drive apparatus.

12. The tape drive apparatus of claim 6, comprising at least one tape bearer element fixed relative to the carrier to provide a tape bearer surface to continue a tape bearer surface of said at least one head element block, wherein the tape bearer surfaces are to engage and support a data-carrying surface of the tape.

13. The tape drive apparatus of claim 6, comprising a tape bearer element fixed relative to the carrier to provide a tape bearer surface to continue a tape bearer surface of said at least one head element block, wherein the tape bearer surfaces are to engage and support a data-carrying surface of the tape.

14. The tape drive apparatus of claim 6, wherein the transducer head elements of each of the first and second head element blocks include read elements to read data on the tape, and write elements to write data on the tape.

15. A method of making a transducer head assembly, the method comprising:
fixing a piezo electric element on one side thereof to a first head element block comprising a longitudinally extending array of transducer elements;

providing at least one electrically conductive connection to enable operation of the piezo electric element in shear mode;

fixing the piezo electric element on an opposite side thereof to a carrier, the carrier supporting the first head element block and a second head element block having a longitudinally extending array of transducer elements;

assembling the first and second head element blocks on the carrier so as to permit movement of the first head element block relative to the second head element block in a direction of a shear axis of the piezo electric element; and fixing, relative to the carrier, a longitudinally extending media bearer element adjacent the first head element block, the media bearer element having a media bearer surface to engage and support a data-carrying surface of a media, wherein the first head element block is movable relative to the media bearer element.

16. The method of claim 15, further comprising:

fixing a further piezo electric element on one side thereof to the second head element block;

providing at least one electrically conductive connection to enable operation of the further piezo electric element in shear mode;

fixing the further piezo electric element on an opposite side thereof to the carrier;

wherein the second head element block is moveable relative to the carrier in a direction of a shear axis of the further piezo electric element.

\* \* \* \* \*